US012412995B2

(12) United States Patent
Zhang et al.

(10) Patent No.: US 12,412,995 B2
(45) Date of Patent: Sep. 9, 2025

(54) FENCE STRUCTURE AND BASE STATION ANTENNA COMPRISING THE SAME

(71) Applicant: Outdoor Wireless Networks LLC, Claremont, NC (US)

(72) Inventors: Jian Zhang, Jiangsu (CN); Bo Wu, Allen, TX (US); Bin Sun, Jiangsu (CN); Cheng Xue, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 48 days.

(21) Appl. No.: 18/691,589

(22) PCT Filed: Aug. 31, 2022

(86) PCT No.: PCT/US2022/075719
§ 371 (c)(1),
(2) Date: Mar. 13, 2024

(87) PCT Pub. No.: WO2023/056150
PCT Pub. Date: Apr. 6, 2023

(65) Prior Publication Data
US 2024/0429620 A1 Dec. 26, 2024

(30) Foreign Application Priority Data
Sep. 29, 2021 (CN) .......................... 202111147305.1

(51) Int. Cl.
*H01Q 21/06* (2006.01)
*H01Q 19/10* (2006.01)
*H01Q 1/24* (2006.01)

(52) U.S. Cl.
CPC ......... *H01Q 21/061* (2013.01); *H01Q 19/106* (2013.01); *H01Q 1/246* (2013.01)

(58) Field of Classification Search
CPC .... H01Q 1/246; H01Q 19/106; H01Q 19/108; H01Q 21/061; H01Q 21/24
See application file for complete search history.

(56) References Cited

U.S. PATENT DOCUMENTS 8,462,071 B1 * 6/2013 Rudish ................ H01Q 21/062 343/810
2018/0108989 A1 4/2018 De Flaviis et al.
(Continued)

OTHER PUBLICATIONS

"International Search Report and Written Opinion of the International Searching Authority", International Application No. PCT/US2022/075719, Dec. 20, 2022, 9 pp.

*Primary Examiner* — Daniel Munoz
(74) *Attorney, Agent, or Firm* — Myers Bigel, P.A.

(57) ABSTRACT

A fence structure for an antenna array having a plurality of radiating elements comprises: a first fence structure comprising a plurality of rows of first transverse fences extending in a first direction and a plurality of columns of first longitudinal fences extending in a second direction perpendicular to the first direction, where the first transverse fences and the first longitudinal fences collectively surround individual radiating elements in a box arrangement; and a second fence structure comprising a plurality of second fences, each second fence being arranged between respective two adjacent first longitudinal fences in a respective column of first longitudinal fences and electrically coupled with first transverse fences located at two sides of the second fence, a height of each second fence is larger than heights of the first transverse fence and the first longitudinal fence.

20 Claims, 9 Drawing Sheets

(56) References Cited

U.S. PATENT DOCUMENTS

| | | | | |
|---|---|---|---|---|
| 2018/0191075 | A1 | 7/2018 | Semonov | |
| 2020/0303836 | A1 | 9/2020 | Li et al. | |
| 2021/0135371 | A1 * | 5/2021 | Zhang | H01Q 19/108 |
| 2023/0216197 | A1 * | 7/2023 | Chen | H01Q 21/26<br>343/702 |

* cited by examiner

FENCE STRUCTURE AND BASE STATION ANTENNA COMPRISING THE SAME

CROSS-REFERENCE TO RELATED APPLICATIONS

The present application is a 35 U.S.C. § 371 national stage application of PCT Application No. PCT/US2022/075719, filed on Aug. 31, 2022, which itself claims priority to Chinese Patent Application No. 202111147305.1, filed Sep. 29, 2021, the entire contents of both of which are incorporated herein by reference as if set forth fully herein.

FIELD

The present disclosure generally relates to the field of antennas, and more specifically, the present disclosure relates to a fence structure suitable for use in a base station antenna and a base station antenna comprising such a fence structure.

BACKGROUND

Cellular communication systems are known in the field. In a typical cellular communication system, a geographic area is divided into a series of regions that are referred to as "cells," and each cell is served by one or more base stations. Each base station may comprise baseband units, radio devices, and antennas, where the antennas may be configured to provide two-way radio frequency (RF) communications with stationary and mobile subscribers (or may be referred to as users) geographically located within the cell. In many cases, a cell may be divided into a plurality of sectors, and each individual antenna provides coverage for each sector. Antennas are usually mounted on a tower or other raised structures and outwardly directed radiation beams ("antenna beams") generated by each antenna serve the corresponding sectors.

SUMMARY

According to an aspect of the present disclosure, a fence structure for an antenna array having a plurality of radiating elements is provided, the fence structure comprising: a first fence structure comprising a plurality of rows of first transverse fences extending in a first direction and a plurality of columns of first longitudinal fences extending in a second direction perpendicular to the first direction, where the first transverse fences and the first longitudinal fences are configured to collectively surround individual radiating elements of the plurality of radiating elements in a box arrangement; and a second fence structure comprising a plurality of second fences, each second fence being arranged between respective two adjacent first longitudinal fences in a respective column of first longitudinal fences and configured to be electrically coupled with first transverse fences located at two sides of the second fence, a height of each second fence in a third direction perpendicular to both the first direction and second direction is larger than heights of the first transverse fence and the first longitudinal fence in the third direction.

In some embodiments, the second fence is in direct electrical contact with the first transverse fences at the two sides of the second fence.

In some embodiments, a first of the second fences capacitively couples with respective first and second of the first transverse fences at the two sides of the first of the second fences.

In some embodiments, the first of the second fences comprises a first coupling part, a second coupling part and a connection part connecting the first coupling part and second coupling part, the first coupling part facing the first of the first transverse fences located at a first side of the first of the second fences to capacitively couple therewith, the second coupling part facing the second of the first transverse fences located at a second side of the first of the second fences opposite to the first side to capacitively couple therewith.

In some embodiments, the first coupling part and the second coupling part of the first of the second fences do not extend beyond the first fence structure in the third direction, and the connection part of the first of the second fences extends beyond the first fence structure in the third direction.

In some embodiments, a first of the second fences comprises a coupling part and a connection part, the coupling part facing a first of the first transverse fences located at a first side of the first of the second fences to capacitively couple therewith, the connection part being in direct electrical contact with a second of the first transverse fences located at a second side of the first of the second fences that is opposite the first side.

In some embodiments, the coupling part of the first of the second fences does not extend beyond the first fence structure in the third direction, and the connection part of the first of the second fences extends beyond the first fence structure in the third direction.

In some embodiments, a first of the second fences has a first part that does not extend beyond the first fence structure in the third direction and a second part that extends beyond the first fence structure in the third direction, and wherein the first part of the first of the second fences has a rectangular shape.

In some embodiments, the second part of the first of the second fences has a rectangular shape or a trapezoidal shape.

In some embodiments, the second part of the first of the second fences comprises an opening.

In some embodiments, a first of the second fences is parallel to a first of the first longitudinal fences.

In some embodiments, a first of the second fences forms an angle relative to a first of the first longitudinal fences.

In some embodiments, a first of the second fences comprises a metal sheet or a printed circuit board covered with a metal foil.

In some embodiments, the first fence structure and the second fence structure are integrally formed.

In some embodiments, a length of a first of the first transverse fences in the first direction is the same as a length of a first of the first longitudinal fences in the second direction, and the height of the first of the first transverse fences in the third direction is the same as the height of the first of the first longitudinal fences in the third direction.

In some embodiments, each second fence is flat or curved.

According to another aspect of the present disclosure, a base station antenna is provided, the base station antenna comprising: a ground plane; an antenna array having a plurality of radiating elements mounted on the ground plane to extend forwardly from the ground plane; and a fence structure mounted on the ground plane, the fence structure being the fence structure according to any embodiment of the aforementioned aspect of the present disclosure, wherein the radiating elements extend farther forwardly from the ground plane than the first transverse fences and the first longitudinal fences of the first fence structure of the fence structure, and the first transverse fences and the first longitudinal fences collectively surround individual radiating elements of the plurality of radiating elements in a box arrangement, and wherein the second fences of the second fence structure of the fence structure extend farther forwardly from the ground plane than the first transverse fences and the first longitudinal fences.

In some embodiments, the second fences extend farther forwardly from the ground plane than the radiating elements.

In some embodiments, the base station antenna further comprises a plurality of radomes located in front of the antenna array.

In some embodiments, the second fence structure is configured to reduce a phase difference between a horizontal component and a vertical component of an antenna beam formed by the antenna array at a scanning angle that exceeds 30°.

In some embodiments, the phase difference between the horizontal component and the vertical component of the antenna beam at the scanning angle that exceeds 30° is reduced by more than 50% as compared with that in a case when the second fence structure does not extend beyond the first fence structure in a direction perpendicular to the ground plane. \

In some embodiments, the second fence structure is configured to substantially have no influence on a phase difference between a horizontal component and a vertical component of an antenna beam formed by the antenna array at a scanning angle of 0°.

In some embodiments, the second fence structure is configured such that a cross-polarization level of an antenna beam formed by the antenna array is less than −20 dB.

According to yet another aspect of the present disclosure, a base station antenna is provided, the base station antenna comprising: a ground plane; an antenna array having a plurality of radiating elements mounted on the ground plane, the antenna array configured to form an antenna beam; a plurality of radomes located in front of the antenna array; and a fence structure mounted on the ground plane, the fence structure configured to reduce a phase difference between a horizontal component and a vertical component of the antenna beam at a scanning angle that exceeds 30°.

In some embodiments, the fence structure is configured to substantially have no influence on a phase difference between the horizontal component and the vertical component of the antenna beam at a scanning angle of 0°.

In some embodiments, the fence structure is configured such that a cross-polarization level of the antenna beam is less than −20 dB.

Through the following detailed description of exemplary embodiments of the present disclosure by referencing the attached drawings, other features and advantages of the present disclosure will become clearer.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the positions, dimensions, and ranges disclosed in the attached drawings and the like.

DETAILED DESCRIPTION

Various exemplary embodiments of the present disclosure will be described in detail below by referencing the attached drawings. It should be noted: unless otherwise specifically stated, the relative arrangement, numerical expressions and numerical values of components and steps set forth in these embodiments do not limit the scope of the present disclosure.

The following description of at least one exemplary embodiment is actually only illustrative, and in no way serves as any limitation to the present disclosure and its application or use. In other words, the structure and method herein are shown in an exemplary manner to illustrate different embodiments of the structure and method in the present disclosure. However, those skilled in the art will understand that they only illustrate exemplary ways of implementing the present disclosure, rather than exhaustive ways. In addition, the attached drawings are not necessarily drawn to scale, and some features may be enlarged to show details of specific components.

In addition, the technologies, methods, and equipment known to those of ordinary skill in the art may not be discussed in detail, but where appropriate, the technologies, methods, and equipment should be regarded as part of the granted Specification.

In all examples shown and discussed herein, any specific value should be construed as merely exemplary value and not as limiting value. Therefore, other examples of the exemplary embodiment may have different values.

Figure 1:
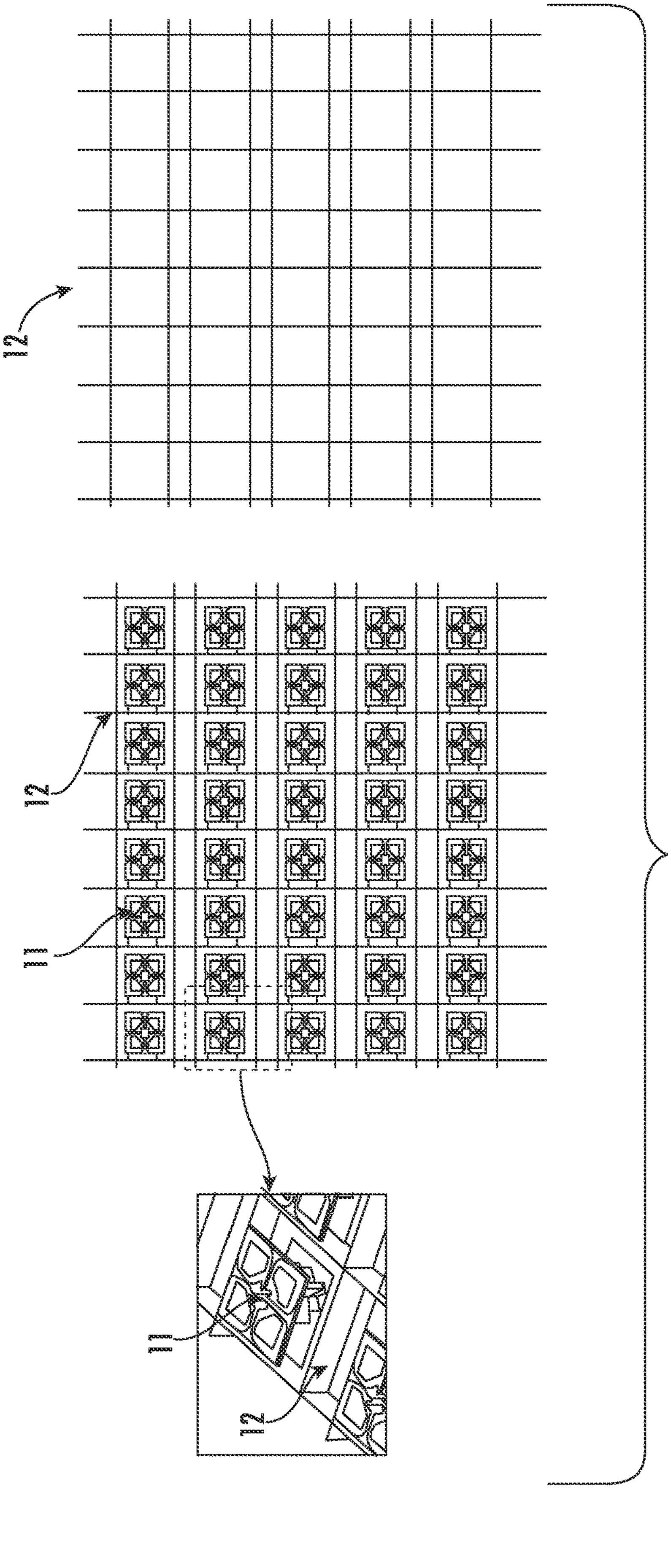
FIG. 1 schematically shows an antenna array and a fence structure for the antenna array.

FIG. 1 shows an antenna array 11, where the antenna array 11 comprises five rows and eight columns of cross-polarizing radiating elements. In order to improve the performance of an antenna beam formed by the antenna array 11, a fence structure 12 may be added to the antenna array 11. As shown in FIG. 1, the fence structure 12 surrounds individual radiating elements of the antenna array 11 in a box arrangement that comprises a plurality of unit boxes arranged in a two-dimensional array. Since the antenna array 11 is usually arranged so that the column spacing of the radiating elements is smaller than the row spacing of the radiating elements, a shape of the unit box of the fence structure 12 configured for surrounding a corresponding radiating element may be a square with the column spacing of the radiating elements as the edge length; this has better symmetry as compared to a rectangular unit box and is thereby capable of providing better beam forming performance. Two adjacent unit boxes of the fence structure 12 that correspond to two adjacent radiating elements in the same row respectively share an edge. Two adjacent unit boxes of the fence structure 12 that correspond to two adjacent radiating elements in the same column respectively are spaced apart and are connected to each other through a connecting part.

Figure 2:
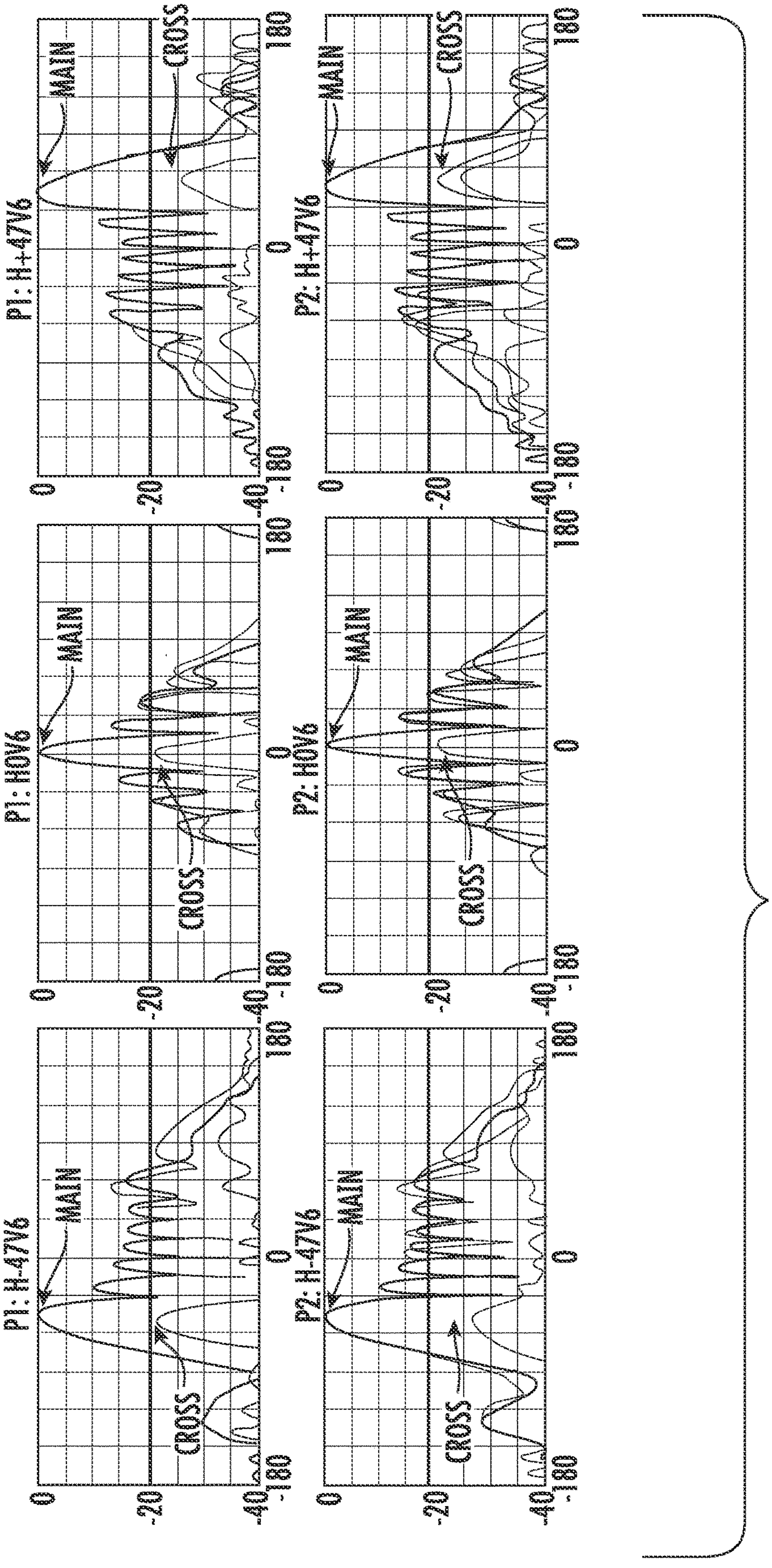
FIG. 2 shows the radiation pattern of the antenna array with the fence structure shown in FIG. 1.

FIG. 2 shows the azimuth pattern of the antenna array 11 with the fence structure 12 shown in FIG. 1. The vertical axis of each graph in FIG. 2 represents the normalized magnitude of the radiation pattern in dB and the horizontal axis represents the azimuth angle in degrees. Although the present disclosure mainly provides explanations with the radiation pattern of a 5G antenna array as an example, this is merely exemplary and not limiting. In FIG. 2, "P1" and "P2" respectively refer to results corresponding to the cross-polarized radiating elements transmitting at the first and second polarizations, respectively, "H-47V6" refers to a horizontal scanning angle of −47° and a vertical scanning angle of 6°, "HOV6" refers to a horizontal scanning angle of 0° and a vertical scanning angle of 6°, and "H47V6" refers to a horizontal scanning angle of 47° and a vertical scanning angle of 6°. It can be seen from FIG. 2 that when the radiating elements of the antenna array 11 are surrounded by the fence structure 12, the cross-polarization level can be always maintained below −20 dB. The cross-polarization level refers to the amount of RF energy that is transmitted at a first polarization by the cross-polarized radiating elements that is converted to the second polarization. Low cross-polarization levels are desirable so that RF signals transmitted at one polarization by the antenna array 11 do not substantially interfere with RF signals transmitted at the other polarization.

Figure 3:
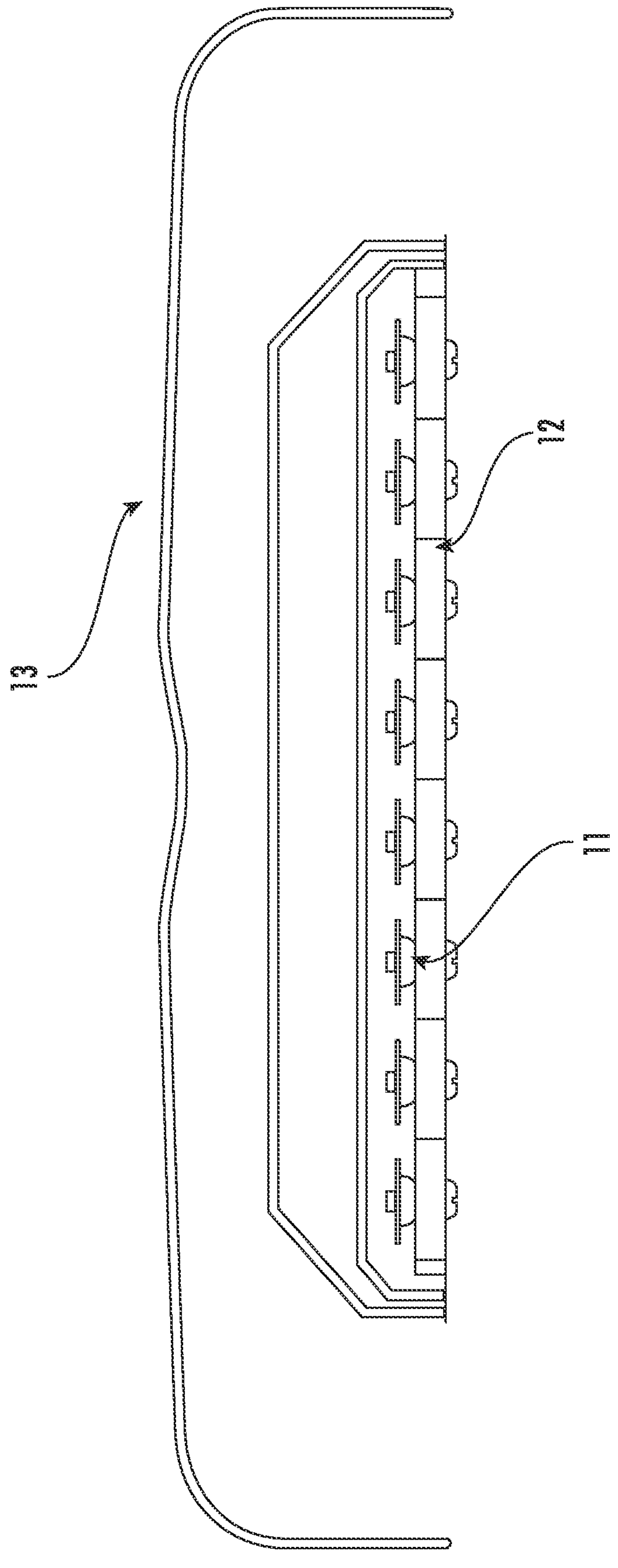
FIG. 3 schematically depicts the situation where a plurality of radomes are provided in front of the antenna array of FIG. 1.
Figure 4:
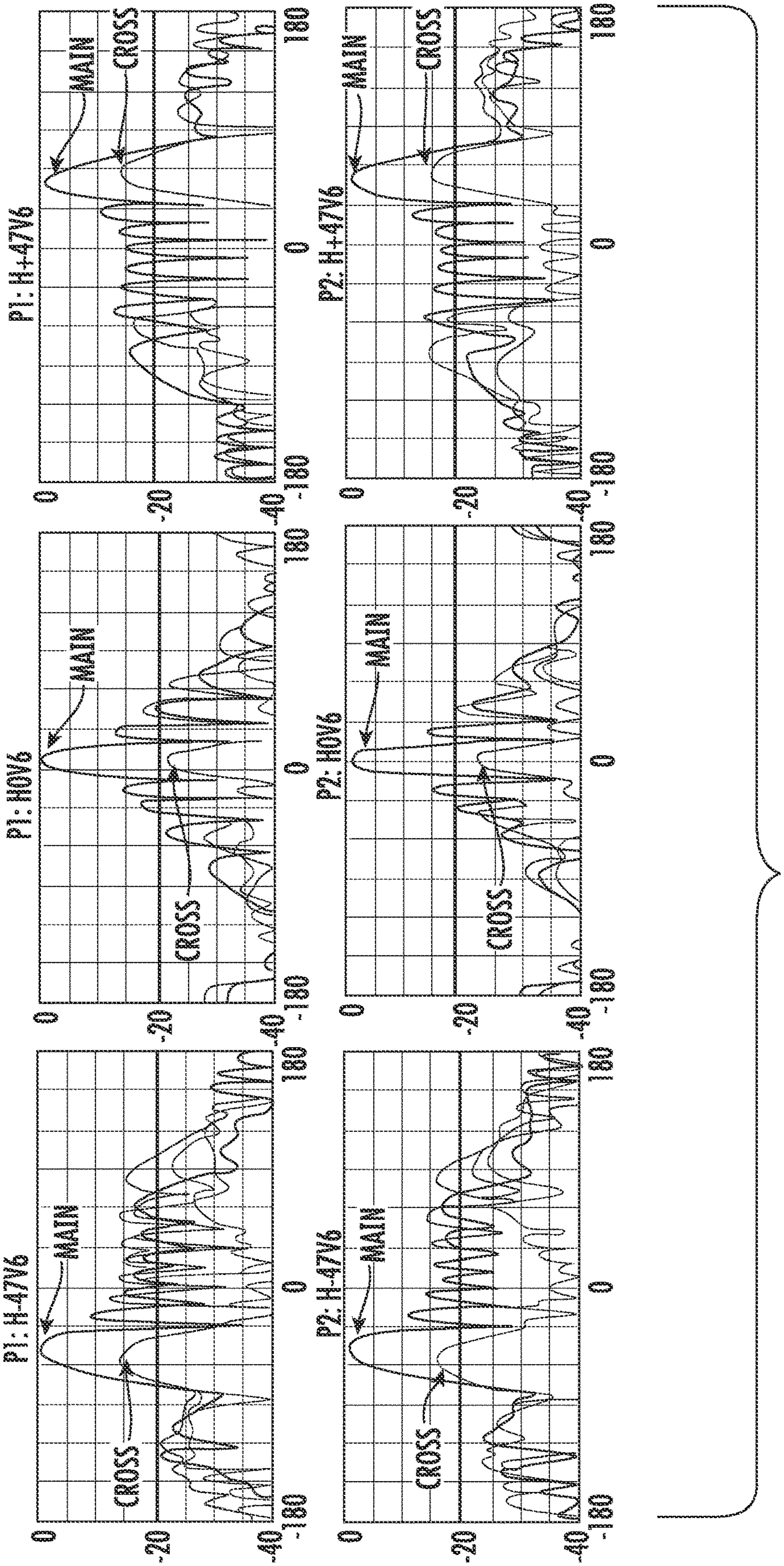
FIG. 4 shows the radiation pattern of a base station antenna having the configuration shown in FIG. 3.

FIG. 2 shows the radiation pattern that is generated when the antenna array 11 is mounted on a reflector without any structures mounted in front of the antenna array 11. In actual application, the antenna array is included in the antenna, and a radome is usually provided in front of the antenna array Moreover, in some cases, it may be desirable to mount an antenna that includes the antenna array 11 on a second antenna that includes additional antenna arrays that operate in other frequency bands. When the antenna array 11 is mounted in such a fashion, the antenna array 11 may not only be mounted behind the radome of its own antenna, but may also be mounted behind one or more radomes of the second antenna. In such a configuration, the RF energy emitted by antenna array 11 will pass through two or more radomes. For example, as shown in FIG. 3, in an actual base station antenna, a plurality of radomes 13 may be present in front of the antenna array 11. FIG. 4 shows the azimuth pattern of the base station antenna shown in FIG. 3. It can be seen that the azimuth pattern of FIG. 4 (where multiple radomes are present) is significantly deteriorated as compared to the azimuth pattern of FIG. 2, especially the cross-polarization level at larger scanning angles where the cross-polarization level exceeds −20 dB.

Regarding this point, the inventors of the present disclosure studied the changes in horizontal and vertical components of antenna beams with and without radomes. The inventors discovered that there were no significant changes in amplitudes of the horizontal component and the vertical component of antenna beams before and after introducing the radomes, but the change in phase differences between the horizontal component and the vertical component were relatively large, especially at a large scanning angle (for example, no less than) 30°, the phase differences between the horizontal component and the vertical component of the antenna beam were significantly increased, as shown in Table 1 below. Therefore, the inventors believe that the introduction of radomes severely affects the phase differences between the horizontal component and the vertical component of the antenna beam, thereby affecting the radiation patterns.

TABLE 1

| Phase Difference between Vertical Component and Horizontal Component | | | | | | | |
|---|---|---|---|---|---|---|---|
| Working frequency | 3.98 GHz | | | | | | |
| Scanning angle | +60° | +47° | +30° | 0° | −30° | −47° | −60° |
| Without radome Fence structure 12 | −7.2° | −0.1° | 3.2° | 8.2° | 3.1° | −4.8° | −7.2° |
| With radome Fence structure 12 | −23.1° | −14.4° | −11.2° | 7.9° | −16.5° | −21.4° | −25.6° |
| Working frequency | 3.84 GHz | | | | | | |
| Scanning angle | +60° | +47° | +30° | 0° | −30° | −47° | −60° |
| Without radome Fence structure 12 | −10.3° | −1.9° | 4.3° | 9° | 3.6° | −0.6° | 0° |
| With radome Fence structure 12 | −21.2° | −15.9° | −12.4° | 8° | −15.3° | −21.6° | −28.6° |
| Working frequency | 3.70 GHz | | | | | | |
| Scanning angle | +60° | +47° | +30° | 0° | −30° | −47° | −60° |
| Without radome Fence structure 12 | −14.4° | −3.9° | 2.5° | 10.2° | 2.4° | −6.7° | −7.2° |
| With radome Fence structure 12 | −24.5° | −17.8° | −13.5° | 8.8° | −18.3° | −22.2° | −28.5° |

In order to resolve the aforementioned problems, the present disclosure provides an improved fence structure which is capable of effectively reducing the phase difference between the horizontal component and the vertical component of an antenna beam and suppressing the cross-polarization level of the antenna beam, thereby promoting the realization of a desired radiation pattern.

Figure 5:
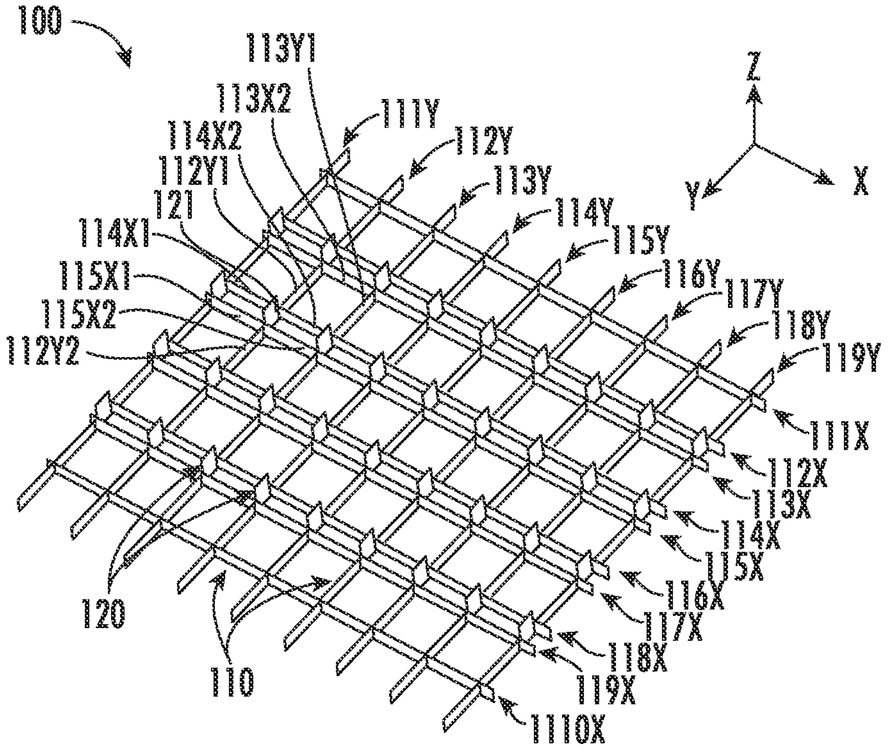
FIG. 5 schematically shows a fence structure according to some embodiments of the present disclosure.

FIG. 5 shows a fence structure 100 according to some embodiments of the present disclosure. The fence structure 100 may be applied to an antenna array having a plurality of radiating elements. The fence structure 100 comprises a first fence structure 110 and a second fence structure 120.

As shown in FIG. 5, the first fence structure 110 comprises a plurality of rows 111X to 1110X of first transverse fences extending in a first direction (X direction) and a plurality of columns 111Y to 119Y of first longitudinal fences extending in a second direction (Y direction) perpendicular to the first direction. The first transverse fences and the first longitudinal fences are configured to collectively surround individual radiating elements of the antenna array in a box arrangement. For example, first transverse fences 113X2 and 114X2 and first longitudinal fences 112Y1 and 113Y1 collectively define a box-shaped space for surrounding a corresponding radiating element. The first fence structure 110 is configured to provide a separate box-shaped space for each radiating element in the antenna array. Therefore, the number of rows of first transverse fences and the number of first transverse fences in each row, and the number of columns of first longitudinal fences and the number of first longitudinal fences in each column may be specifically set depending on the arrangement of the radiating elements of the antenna array. For example, in the example in FIG. 5, the number of rows of first transverse fences may be equal to two times of the number of rows of radiating elements, the number of first transverse fences in each row may be equal to the number of radiating elements in each row, the number of columns of first longitudinal fences may exceed the number of columns of radiating elements by one and the number of first longitudinal fences in each column may be equal to the number of radiating elements in each column. In some embodiments, each row of first transverse fences may be integrally formed. In some embodiments, the first transverse fences and the first longitudinal fences defining the box-shaped spaces for the same row of radiating elements may be integrally formed. In some embodiments, the length of the first transverse fence in the first direction is the same as the length of the first longitudinal fence in the second direction, and the height of the first transverse fence in the third direction (direction Z) perpendicular to both the first direction and second direction is the same as the height of the first longitudinal fence in the third direction. In view that the antenna array is usually configured such that the column spacing of radiating elements is smaller than the row spacing of radiating elements, in some embodiments, the length of the first transverse fence in the first direction and the length of the first longitudinal fence in the second direction may be equal to the column spacing of the radiating elements (as more clearly shown in FIG. 6 described later). In this case, the box-shaped spaces for adjacent radiating elements in the same row may share a first longitudinal fence. In some other embodiments, where the defined box-shaped space is guaranteed to be sufficient for accommodating the radiating element, the length of the first transverse fence in the first direction may be equal to the column spacing of radiating elements and the length of the first longitudinal fence in the second direction may be smaller than the column spacing of radiating elements. This may still form a square box-shaped space with the length of the first longitudinal fence in the second direction as the edge length, but the number of columns of first longitudinal fences will become two times of the number of columns of radiating elements.

The fence structure 100 further comprises a second fence structure 120. The second fence structure 120 comprises a plurality of second fences (such as 121). The height of each second fence in the third direction is larger than the heights of the first transverse fence and the first longitudinal fence in the third direction. Each second fence is arranged between respective two adjacent first longitudinal fences in a respective column of first longitudinal fences. For example, the second fence 121 is arranged between first longitudinal fences 112Y1 and 112Y2. The second fence is configured to be electrically coupled with first transverse fences located at two sides of the second fence. For example, the second fence 121 may be electrically coupled to at least one of first transverse fences 114X1 and 114X2 at one side thereof, and be electrically coupled to at least one of first transverse fences 115X1 and 115X2 at the other side thereof. Therefore, in the fence structure 100, the first fence structure 110 realizes electrical coupling between individual parts of the first fence structure 110 for surrounding individual rows of radiating elements, respectively, through the second fence structure 120 arranged there among. In some embodiments, the first fence structure 110 and the second fence structure 120 may be integrally formed.

The first transverse fence and the first longitudinal fence, for example, may be formed from a metal sheet, a printed circuit board covered with a metal foil, a plastic substrate with metal deposited thereon or other suitable electrically conductive materials. Similarly, the second fence, for example, may be formed with a metal sheet, a printed circuit board covered with a metal foil, a plastic substrate with metal deposited thereon or other suitable electrically conductive materials.

Figure 6:
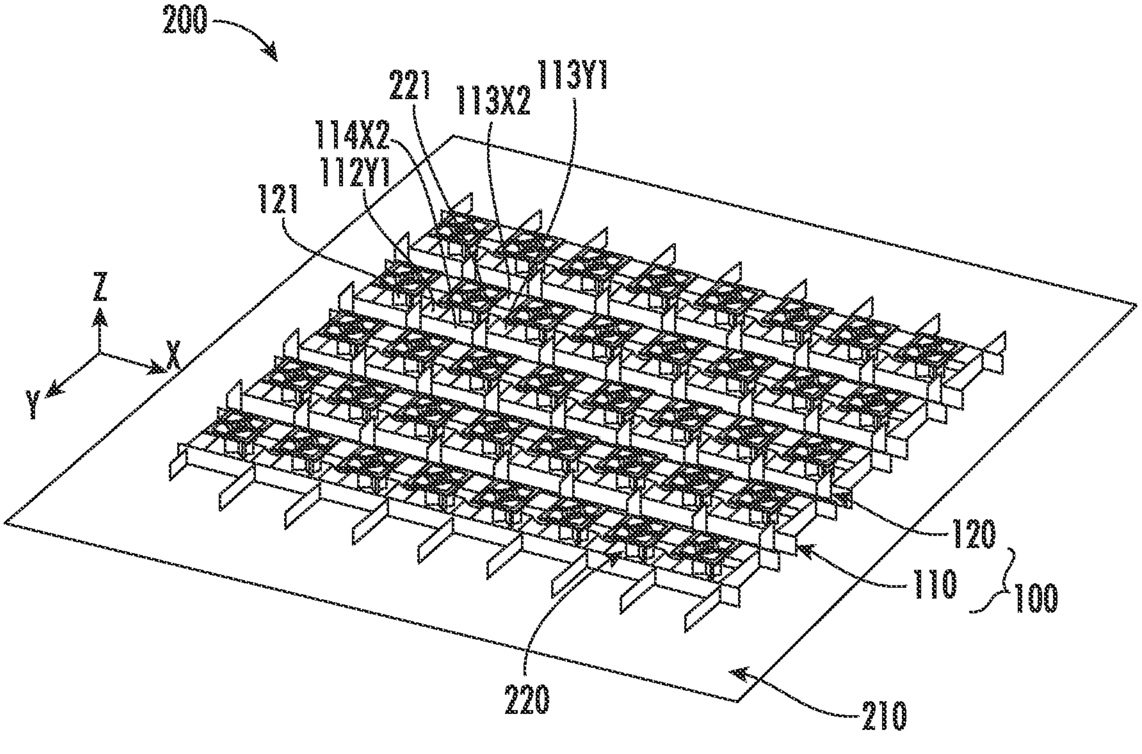
FIG. 6 schematically shows a base station antenna according to some embodiments of the present disclosure.

FIG. 6 shows a base station antenna 200 according to some embodiments of the present disclosure, which may comprise the fence structure 100 shown in FIG. 5. As shown in FIG. 6, the base station antenna 200 comprises a ground plane 210 and an antenna array 220 having a plurality of radiating elements mounted on the ground plane 210. The radiating elements in FIG. 6 are depicted as cross-polarized radiating elements, but this is merely exemplary. The antenna array 220 is configured to form an antenna beam. The fence structure 100 is mounted on and extends forwardly from the ground plane 210. The fence structure 100 may be electrically connected to the ground plane 210 by a direct galvanic connection and/or by a capacitive connection. The ground plane 210, for example, may be a reflector of the base station antenna 200. The radiating elements may extend farther forwardly from the ground plane 210 than either the first transverse fences or the first longitudinal fences of the first fence structure 110 of the fence structure 100. The second fences of the second fence structure 120 of the fence structure 100 extend farther forwardly from the ground plane 210 than the first transverse fences and the first longitudinal fences. In some embodiments, as shown in FIG. 6, the second fences may extend farther forwardly from the ground plane 210 than the radiating elements. The first transverse fences and the first longitudinal fences form unit boxes that collectively surround individual radiating elements in the antenna array 220. For example, the first transverse fences 113X2 and 114X2 and first longitudinal fences 112Y1 and 113Y1 collectively define a box-shaped space for surrounding one of the radiating elements 221.

Figure 7:
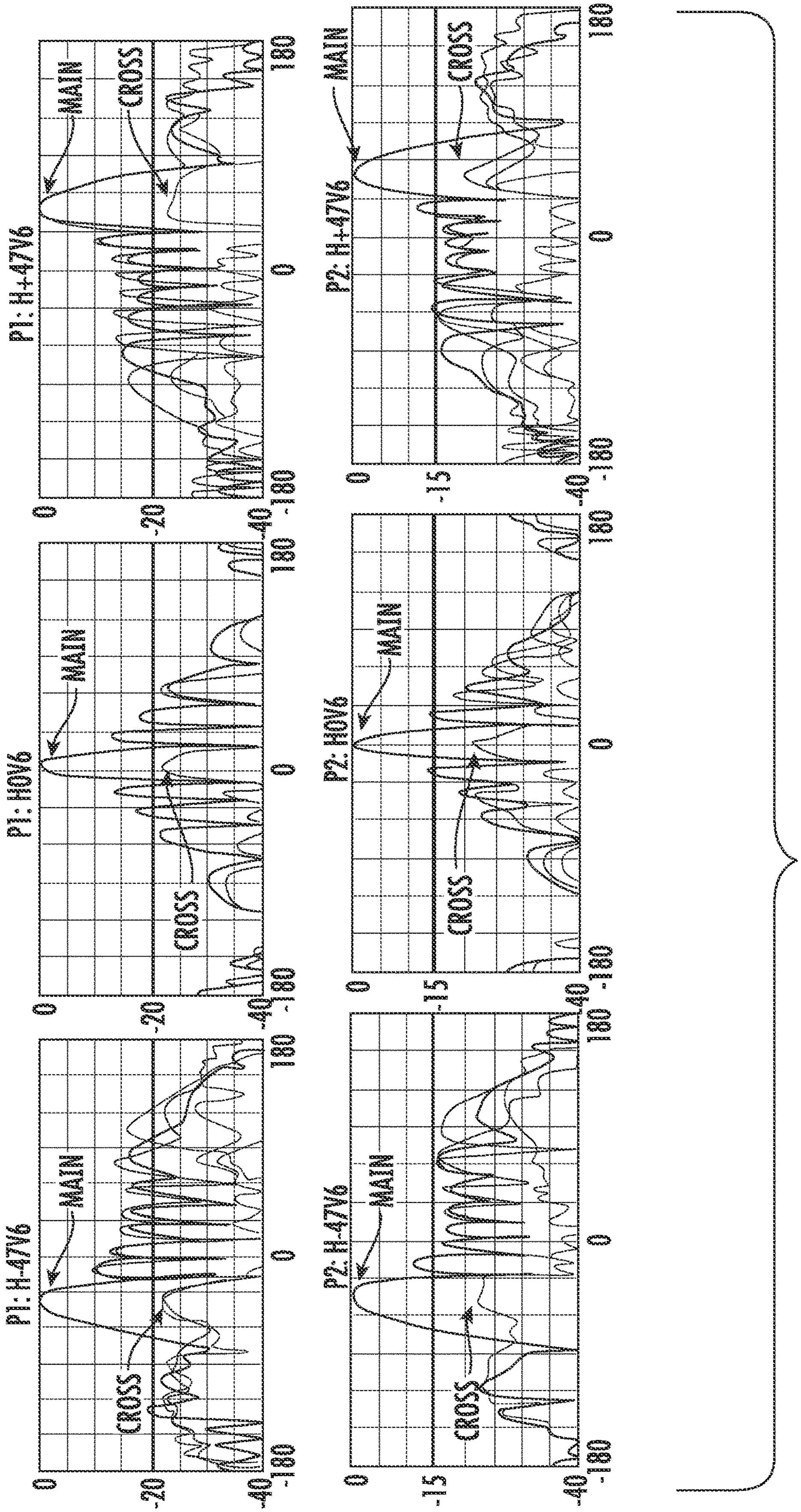
FIG. 7 shows the radiation pattern of the base station antenna of FIG. 6.

In some embodiments, the base station antenna 200 further comprises a plurality of radomes (similar to the plurality of radomes 13 in FIG. 3) located in front of the antenna array 220. FIG. 7 shows the radiation pattern of the base station antenna 200, which differs from that in FIG. 3 in that the fence structure 12 is changed to the fence structure 100. It can be seen from FIG. 7 that the fence structure 100 effectively suppresses the cross-polarization level of the antenna beam formed by the antenna array 220 to be below −20 dB. The inventors further compared the phase differences between the horizontal component and the vertical component of the antenna beam when the base station antenna uses the fence structure 12 and fence structure 100, as shown in Table 2 below.

TABLE 2

Phase Differences between Vertical Component and Horizontal Component

| Working frequency | 3.98 GHz | | | | | | |
|---|---|---|---|---|---|---|---|
| Scanning angle | +60° | +47° | +30° | 0° | −30° | −47° | −60° |
| Without radome Fence structure 12 | −7.2° | −0.1° | 3.2° | 8.2° | 3.1° | −4.8° | −7.2° |
| With radome Fence structure 12 | −23.1° | −14.4° | −11.2° | 7.9° | −16.5° | −21.4° | −25.6° |
| With radome Fence structure 100 | −14.4° | −3.1° | −2.2° | 8.6° | −3.5° | −7.2° | −3.6° |
| **Working frequency** | **3.84 GHz** | | | | | | |
| Scanning angle | +60° | +47° | +30° | 0° | −30° | −47° | −60° |
| Without radome Fence structure 12 | −10.3° | −1.9° | 4.3° | 9° | 3.6° | −0.6° | 0° |
| With radome Fence structure 12 | −21.2° | −15.9° | −12.4° | 8° | −15.3° | −21.6° | −28.6° |
| With radome Fence structure 100 | −3.6° | −4.8° | −2.3° | 8.1° | −1.5° | −9.1° | −14.4° |
| **Working frequency** | **3.70 GHz** | | | | | | |
| Scanning angle | +60° | +47° | +30° | 0° | −30° | −47° | −60° |
| Without radome Fence structure 12 | −14.4° | −3.9° | 2.5° | 10.2° | 2.4° | −6.7° | −7.2° |
| With radome Fence structure 12 | −24.5° | −17.8° | −13.5° | 8.8° | −18.3° | −22.2° | −28.5° |
| With radome Fence structure 100 | −10.8° | −6.1° | −3.2° | 8.7° | −2.8° | −9.7° | −14.4° |

The main difference between the fence structure 100 and the fence structure 12 is in the second fence structure 120. This shows that the fence structure 100, especially the second fence structure 120, successfully reduces the negative impact of the radomes on the antenna beam formed by the antenna array 220, such that the phase difference between the horizontal component and the vertical component of the antenna beam is significantly reduced, thereby ensuring that the cross-polarization level of the antenna beam is less than −20 dB. In some embodiments, the second fence structure 120 may be configured to reduce the phase difference between the horizontal component and the vertical component of the antenna beam formed by the antenna array 220 at a scanning angle of no less than 30°. In particular, in some embodiments, the second fence structure 120 may be configured such that the phase difference between the horizontal component and the vertical component of the antenna beam formed by the antenna array 220 at a scanning angle of no less than 30° is reduced by more than 50% as compared with that in a case when the second fence structure 120 does not extend beyond the first fence structure 110 in a direction (third direction) perpendicular to the ground plane 210 (equivalent to the case of the fence structure 12). For example, as shown in Table 2, as compared to the case where the fence structure 12 is used, when the fence structure 100 is used, the phase differences between the horizontal component and the vertical component of the antenna beam at a frequency of 3.98 GHz at scanning angles of 47° and −47° are reduced by 11.3° (approximately 78%) and 14.2° (approximately 66%), respectively, the phase differences between the horizontal component and the vertical component of the antenna beam at a frequency of 3.84 GHz at scanning angles of 47° and −47° are reduced by 11.1° (approximately 70%) and 12.5° (approximately 58%), respectively, and the phase differences between the horizontal component and the vertical component of the antenna beam at a frequency of 3.7 GHz at scanning angles of 47° and −47° are reduced by 11.8° (approximately 66%) and 12.5° (approximately 56%), respectively. In some embodiments, the second fence structure 120 may be configured to substantially have no influence on the phase difference between the horizontal component and the vertical component of the antenna beam formed by the antenna array 220 at a scanning angle of 0°. The term "substantially" herein may refer to changes not exceeding 10% of the described value. For example, as shown in Table 2, as compared to the case where the fence structure 12 is used, when the fence structure 100 is used, the phase difference between the horizontal component and the vertical component of the antenna beam at a frequency of 3.98 GHz at the scanning angle of 0° only changed by 0.7° (approximately 9%) and the phase differences between the horizontal component and the vertical component of the antenna beam at frequencies of 3.84 GHz and 3.7 GHz at the scanning angle of 0° only changed by 0.1° (approximately 1%). Therefore, the fence structure according to the embodiments of the present disclosure is capable of improving the phase difference between the horizontal component and the vertical component of the antenna beam at a scanning angle of no less than 30° while substantially not degrading the phase difference between the horizontal component and the vertical component of the antenna beam at a scanning angle of 0°.

Various exemplary modifications of the fence structure 100 according to the present disclosure are described with reference to FIG. 5 and FIG. 8 to FIG. 14 below.

Figure 8:
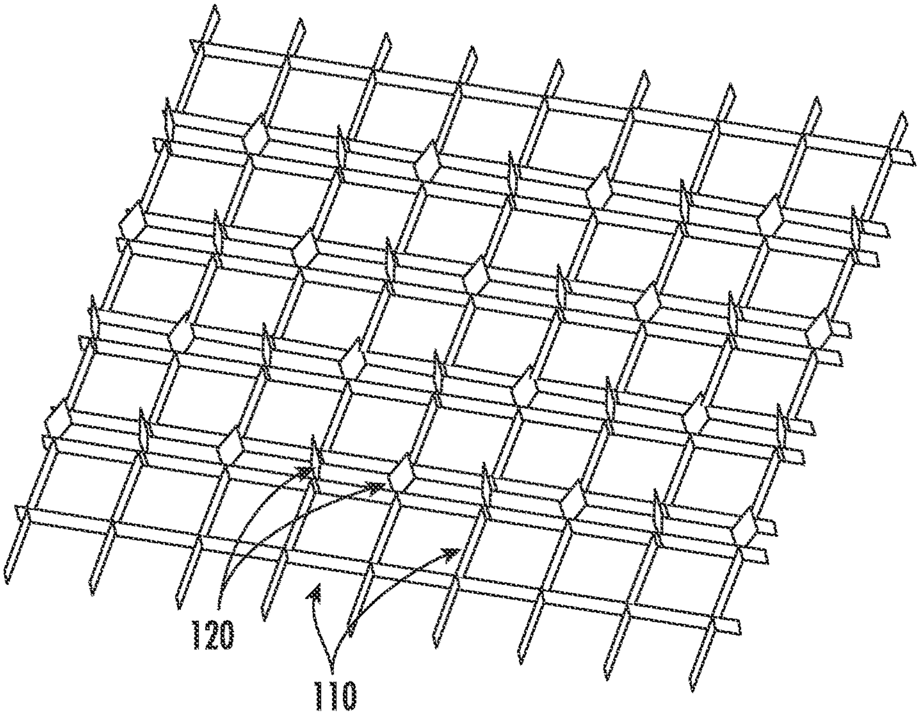
FIG. 8 to FIG. 14 schematically show fence structures according to some embodiments of the present disclosure.

In some embodiments, the second fence may be parallel to the first longitudinal fence, for example as shown in FIG. 6. In some embodiments, the second fence may form an angle relative to the first longitudinal fence, for example as shown in FIG. 8. The rotation direction and angle of each second fence do not have to be the same as each other.

Figure 9:
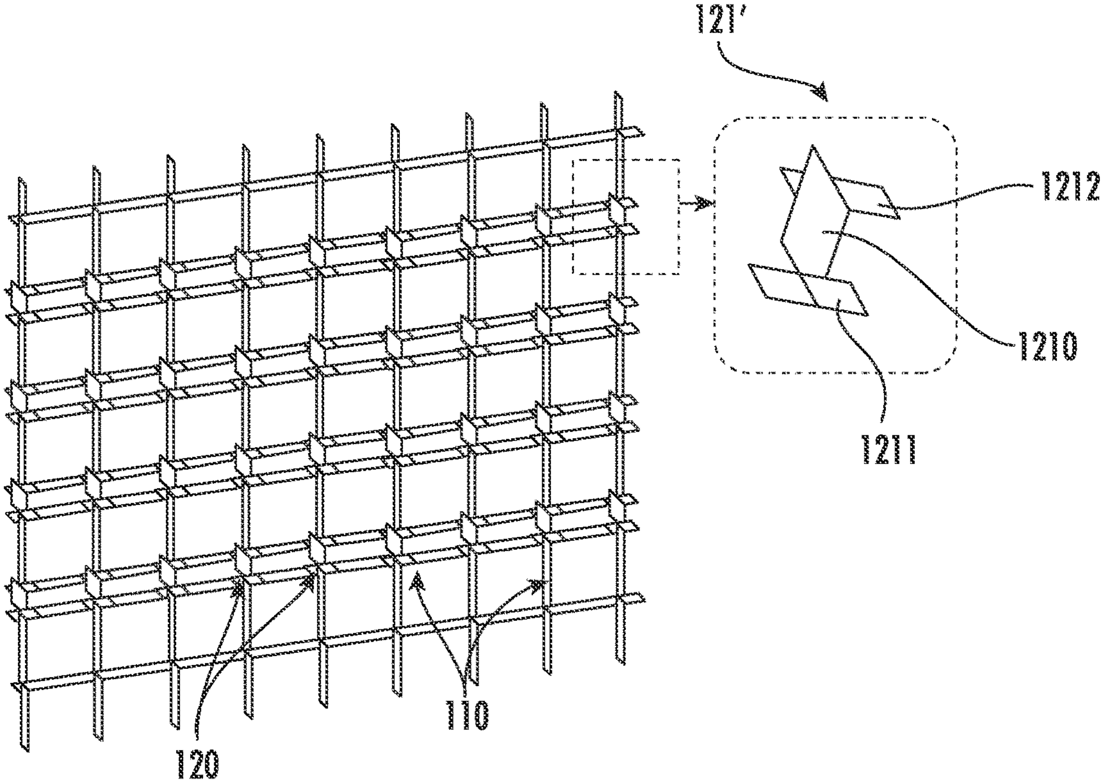
Figure 10:
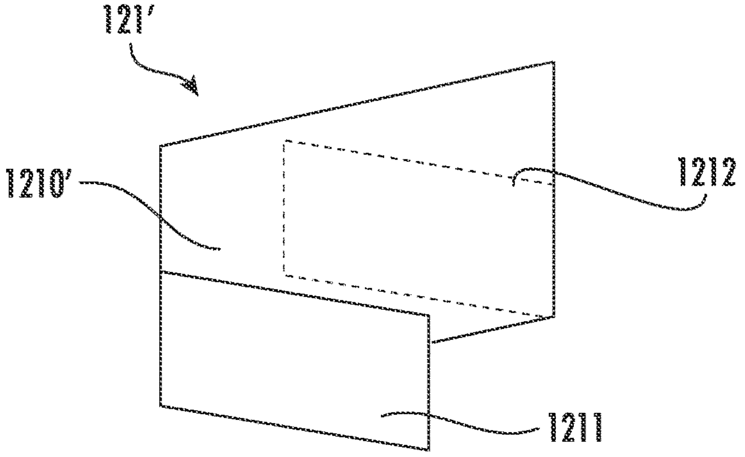
Figure 11:
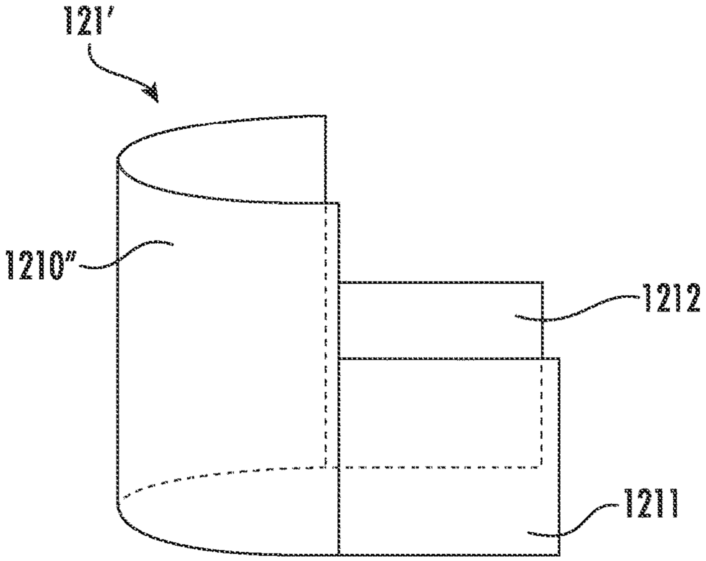
Figure 12:
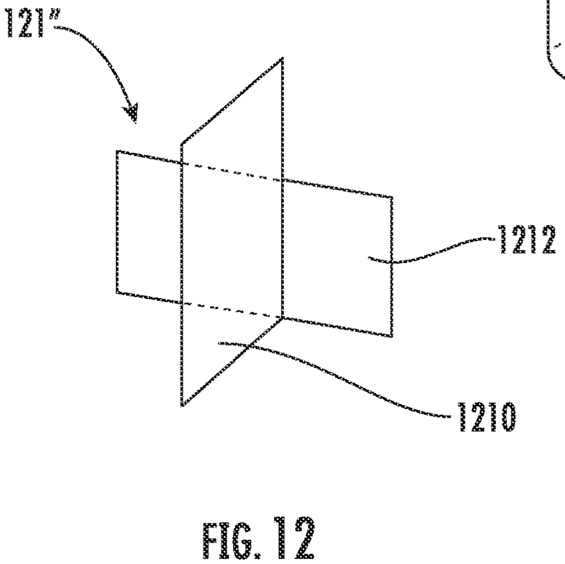

In some embodiments, some or all of the second fences may be in direct electrical contact with the first transverse fences that are at the two sides of each second fence. As shown in FIG. 5, each second fence may be directly physically and electrically connected with the first transverse fences at opposed sides thereof. In some embodiments, each second fence may capacitively couple with the first transverse fences at the two sides thereof. For example, as shown in FIG. 9, the second fence 121' comprises a first coupling part 1211, a second coupling part 1212 and a connection part 1210 connecting the first coupling part 1211 and second coupling part 1212. The first coupling part 1211 faces the first transverse fence located at a first side of the second fence 121' to capacitively couple therewith, and the second coupling part 1212 faces the first transverse fence located at a second side of the second fence 121' opposite to the first side to capacitively couple therewith. There may be gaps between the first coupling part 1211, second coupling part 1212 and the respective first transverse fences, but sufficient coupling area is required to promote capacitive coupling. In some embodiments, the first coupling part 1211 and second coupling part 1212 of the second fence 121' may not extend beyond the first fence structure 110 in the third direction, and the connection part 1210 of the second fence 121' may extend beyond the first fence structure 110 in the third direction. In some embodiments, the first coupling part 1211 and second coupling part 1212 of the second fence 121' may extend beyond the first fence structure 110 in the third direction. FIG. 10 shows a modification of the second fence 121', in which the connection part 1210' may form an angle relative to the first longitudinal fence. In addition, in some embodiments, the second fence may be flat or curved. For example, FIG. 11 shows another modification of the second fence 121', in which the connection part 1210' is curved. In some embodiments, the second fence may also be in direct electrical contact with a respective first transverse fence at one side thereof and capacitive couple with a respective first transverse fence at the other side thereof. For example, as shown in FIG. 12, the second fence 121' comprises a coupling part 1212 and a connection part 1210, where the coupling part 1212 may face the first transverse fence located at the first side of the second fence to capacitively couple therewith, and the connection part 1210 may be in direct electrical contact with the first transverse fence located at the second side of the second fence opposite to the first side. In some embodiments, the coupling part 1212 of the second fence 121' may not extend beyond the first fence structure 110 in the third direction, and the connection part 1210 of the second fence 121' may extend beyond the first fence structure in the third direction. In some embodiments, the coupling part 1212 of the second fence 121' may extend beyond the first fence structure 110 in the third direction.

Based on the above, the second fence may have more variations. For example, the XY cross-sectional shape of the second fence may be "|" (as shown in FIG. 5), "/" or "\" (as shown in FIG. 8), "H" (as shown in FIG. 9), "Z" (as shown in FIG. 10), "U" (as shown in FIG. 11), "T" (as shown in FIG. 12), and may also be but not limited to "Σ," "⊥," or "Γ," etc.

Figure 13:
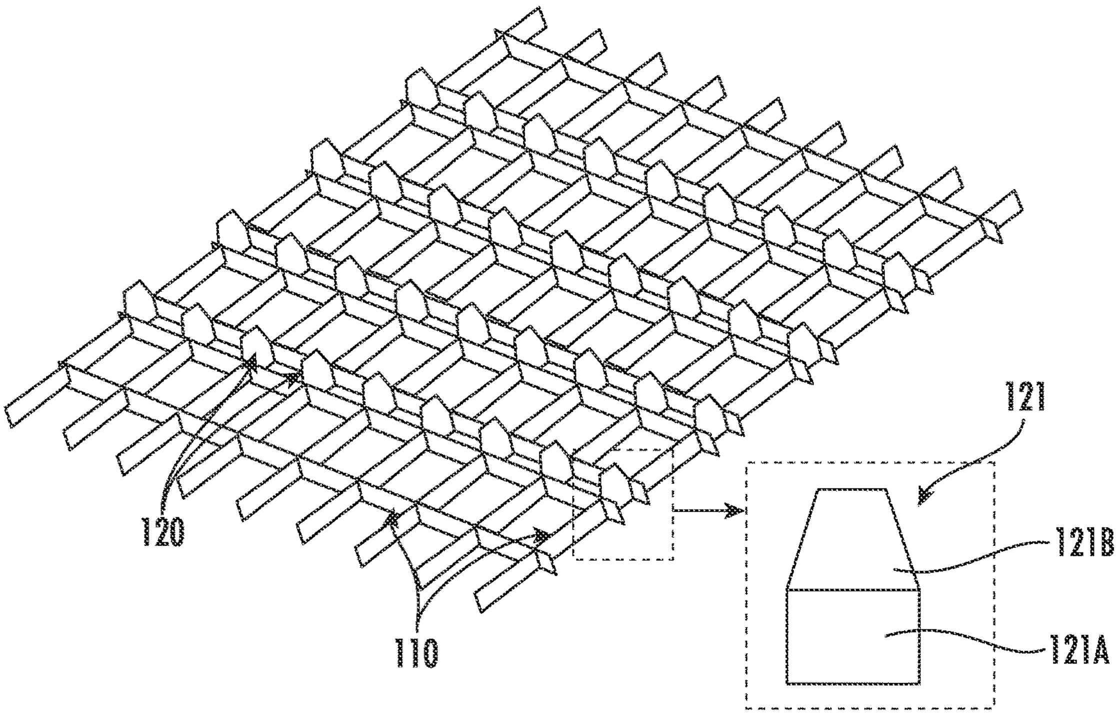
Figure 14:
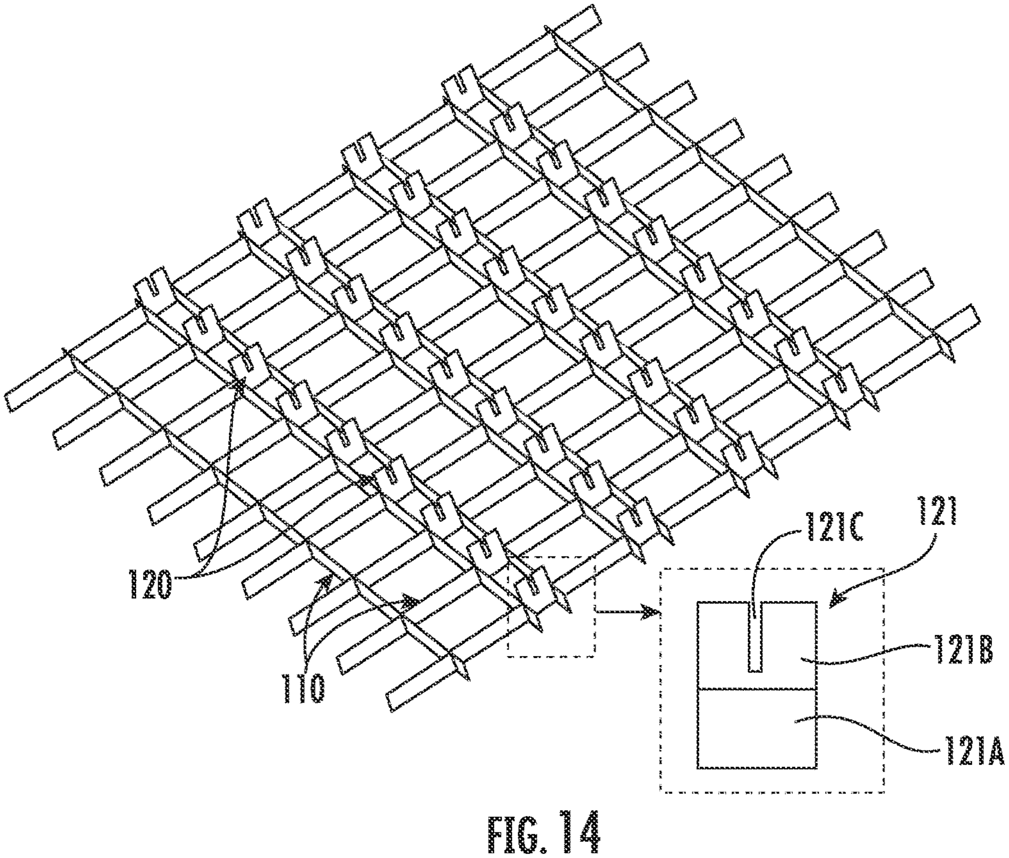

The second fence may be regarded as comprising a first part that does not extend beyond the first fence structure 110 in the third direction and a second part that extends beyond the first fence structure 110 in the third direction. The first part of the second fence may have a rectangular shape. In some embodiments, the second part of the second fence may have a rectangular shape, a trapezoidal shape or other suitable shapes. As shown in FIG. 5, the second fence 121 is rectangular. In addition, as shown in FIG. 13, the first part 121A of the second fence 121 is rectangular and the second part 121B is trapezoidal. In some embodiments, the second part of the second fence may comprise an opening. The opening may be in the form of a hole or a slot. As shown in FIG. 14, the first part 121A and second part 121B of the second fence 121 are rectangular, and the second part 121B comprises the opening 121C.

The fence structure of the present disclosure is capable of effectively reducing the phase difference between the horizontal component and the vertical component of the antenna beam formed by an antenna array that has multiple radomes positioned in front of the radiating elements of the array, suppressing the cross-polarization level of the antenna beam below −20 dB, and improving other aspects of the radiation pattern.

The terms "left," "right," "front," "rear," "top," "bottom," "upper," "lower," "high," "low" in the descriptions and claims, if present, are used for descriptive purposes and not necessarily used to describe constant relative positions. It should be understood that the terms used in this way are interchangeable under appropriate circumstances, so that the embodiments of the present disclosure described herein, for example, can operate on other orientations that differ from those orientations shown herein or otherwise described. For example, when the device in the drawing is turned upside down, features that were originally described as "above" other features can now be described as "below" other features. The device may also be oriented by other means (rotated by 90 degrees or at other locations), and at this time, a relative spatial relation will be explained accordingly.

In the Specification and Claims, when an element is referred to as being "above" another element, "attached" to another element, "connected" to another element, "coupled" to another element, or "contacting" another element," the element may be directly above another element, directly attached to another element, directly connected to another element, directly coupled to another element, or directly contacting another element, or there may be one or a plurality of intermediate elements. In contrast, if an element is described "directly" "above" another element, "directly attached" to another element, "directly connected" to another element, "directly coupled" to another element or "directly contacting" another element, there will be no intermediate elements. In the Specification and Claims, a feature that is arranged "adjacent" to another feature, may denote that a feature has a part that overlaps an adjacent feature or a part located above or below the adjacent feature.

As used herein, the word "exemplary" means "serving as an example, instance, or illustration" rather than as a "model" to be copied exactly. Any realization method described exemplarily herein is not necessarily interpreted as being preferable or advantageous over other realization methods. Moreover, the present disclosure is not limited by any expressed or implied theory given in the technical field, background art, summary of the invention, or specific implementation methods.

In addition, for reference purposes only, "first," "second" and similar terms may also be used herein, and thus are not intended to be limitative. For example, unless the context clearly indicates, the words "first," "second" and other such numerical words involving structures or elements do not imply a sequence or order. It should also be understood that when the term "include/comprise" is used in this text, it indicates the presence of the specified feature, entirety, step, operation, unit and/or component, but does not exclude the presence or addition of one or more other features, entireties, steps, operations, units and/or components and/or combinations thereof. In the present disclosure, the term "provide" is used in a broad sense to cover all ways of obtaining an object, so "providing an object" includes but is not limited to "purchase," "preparation/manufacturing," "arrangement/setting," "installation/assembly," and/or "order" of the object, etc.

As used herein, the term "and/or" includes any and all combinations of one or more of the associated listed items. The terms used herein are only for the purpose of describing specific embodiments, and are not intended to limit the present disclosure. As used herein, the singular forms "a," "an" and "the" are also intended to include the plural forms, unless the context clearly dictates otherwise.

Those skilled in the art should realize that the boundaries between the above operations are merely illustrative. A plurality of operations can be combined into a single operation, which may be distributed in the additional operation, and the operations can be executed at least partially overlapping in time. Also, alternative embodiments may include a plurality of instances of specific operations, and the order of operations may be changed in other various embodiments. However, other modifications, changes and substitutions are also possible. Aspects and elements of all embodiments disclosed above may be combined in any manner and/or in conjunction with aspects or elements of other embodiments to provide a plurality of additional embodiments. Therefore, the Specification and attached drawings hereof should be regarded as illustrative rather than limitative.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

That which is claimed is:

1. A fence structure for an antenna array having a plurality of radiating elements, the fence structure comprising:

a first fence structure comprising a plurality of rows of first transverse fences extending in a first direction and a plurality of columns of first longitudinal fences extending in a second direction perpendicular to the first direction, where the first transverse fences and the first longitudinal fences are configured to collectively surround individual radiating elements of the plurality of radiating elements in a box arrangement; and a second fence structure comprising a plurality of second fences, each second fence being arranged between respective two adjacent first longitudinal fences in a respective column of first longitudinal fences and configured to be electrically coupled with first transverse fences located at two sides of the second fence, a height of each second fence in a third direction perpendicular to both the first direction and second direction is larger than heights of the first transverse fence and the first longitudinal fence in the third direction.

2. The fence structure according to claim 1, wherein each second fence is in direct electrical contact with the first transverse fences at the two sides of the respective second fence.

3. The fence structure according to claim 1, wherein a first of the second fences capacitively couples with respective first and second of the first transverse fences at the two sides of the first of the second fences.

4. The fence structure according to claim 3, wherein the first of the second fences comprises a first coupling part, a second coupling part and a connection part connecting the first coupling part and second coupling part, the first coupling part facing the first of the first transverse fences located at a first side of the first of the second fences to capacitively couple therewith, the second coupling part facing the second of the first transverse fences located at a second side of the first of the second fences opposite to the first side to capacitively couple therewith.

5. The fence structure according to claim 4, wherein the first coupling part and the second coupling part of the first of the second fences do not extend beyond the first fence structure in the third direction, and the connection part of the first of the second fences extends beyond the first fence structure in the third direction.

6. The fence structure according to claim 1, wherein a first of the second fences comprises a coupling part and a connection part, the coupling part facing a first of the first transverse fences located at a first side of the first of the second fences to capacitively couple therewith, the connection part being in direct electrical contact with a second of the first transverse fences located at a second side of the first of the second fences that is opposite the first side.

7. The fence structure according to claim 6, wherein the coupling part of the first of the second fences does not extend beyond the first fence structure in the third direction, and the connection part of the first of the second fences extends beyond the first fence structure in the third direction.

8. The fence structure according to claim 1, wherein a first of the second fences has a first part that does not extend beyond the first fence structure in the third direction and a second part that extends beyond the first fence structure in the third direction, and wherein the first part of the first of the second fences has a rectangular shape.

9. The fence structure according to claim 8, wherein the second part of the first of the second fences comprises an opening.

10. The fence structure according to claim 1, wherein a first of the second fences is parallel to a first of the first longitudinal fences.

11. The fence structure according to claim 1, wherein a first of the second fences forms an angle relative to a first of the first longitudinal fences.

12. The fence structure according to claim 1, wherein a length of a first of the first transverse fences in the first direction is the same as a length of a first of the first longitudinal fences in the second direction, and the height of the first of the first transverse fences in the third direction is the same as the height of the first of the first longitudinal fences in the third direction.

13. A base station antenna, comprising:

a ground plane;

an antenna array having a plurality of radiating elements mounted on the ground plane to extend forwardly from the ground plane; and a fence structure mounted on the ground plane, the fence structure being the fence structure according to claim 1, wherein the radiating elements extend farther forwardly from the ground plane than the first transverse fences and the first longitudinal fences of the first fence structure of the fence structure, and the first transverse fences and the first longitudinal fences collectively surround individual radiating elements of the plurality of radiating elements in a box arrangement, and wherein the second fences of the second fence structure of the fence structure extend farther forwardly from the ground plane than the first transverse fences and the first longitudinal fences.

14. The base station antenna according to claim 13, wherein the second fences extend farther forwardly from the ground plane than the radiating elements.

15. The base station antenna according to claim 13, further comprising a plurality of radomes located in front of the antenna array.

16. The base station antenna according to claim 13, wherein the second fence structure is configured to reduce a phase difference between a horizontal component and a vertical component of an antenna beam formed by the antenna array at a scanning angle that exceeds 30°.

17. The base station antenna according to claim 16, wherein the phase difference between the horizontal component and the vertical component of the antenna beam at the scanning angle that exceeds 30° is reduced by more than 50% as compared with that in a case when the second fence structure does not extend beyond the first fence structure in a direction perpendicular to the ground plane.

18. The base station antenna according to claim 13, wherein the second fence structure is configured to substantially have no influence on a phase difference between a horizontal component and a vertical component of an antenna beam formed by the antenna array at a scanning angle of 0°.

19. A base station antenna, comprising:

a ground plane;

an antenna array having a plurality of radiating elements mounted on the ground plane, the antenna array configured to form an antenna beam;

a plurality of radomes located in front of the antenna array; and a fence structure mounted on the ground plane, the fence structure configured to reduce a phase difference between a horizontal component and a vertical component of the antenna beam at a scanning angle that exceeds 30°.

20. The base station antenna according to claim 19, wherein the fence structure is configured to substantially have no influence on a phase difference between the horizontal component and the vertical component of the antenna beam at a scanning angle of 0°.

* * * * *